United States Patent
Yang et al.

(10) Patent No.: US 9,670,886 B2
(45) Date of Patent: Jun. 6, 2017

(54) INTEGRATED EXHAUST GAS RECIRCULATION COOLER

(71) Applicants: HYUNDAI MOTOR COMPANY, Seoul (KR); Kia Motors Corporation, Seoul (KR)

(72) Inventors: Il Suk Yang, Hwaseong-si (KR); Jong Sub Lee, Yongin-si (KR); Han Sang Kim, Ansan-si (KR)

(73) Assignees: HYUNDAI MOTOR COMPANY, Seoul (KR); KIA MOTOR CORPORATION, Seoul (KR)

( * ) Notice: Subject to any disclaimer, the term of this patent is extended or adjusted under 35 U.S.C. 154(b) by 76 days.

(21) Appl. No.: 14/810,281

(22) Filed: Jul. 27, 2015

(65) Prior Publication Data

US 2016/0230708 A1    Aug. 11, 2016

(30) Foreign Application Priority Data

Feb. 9, 2015    (KR) .......................... 10-2015-0019505

(51) Int. Cl.
| | |
|---|---|
| F02B 47/08 | (2006.01) |
| F02M 25/07 | (2006.01) |
| F02M 26/32 | (2016.01) |
| F02M 26/28 | (2016.01) |
| F02M 26/33 | (2016.01) |
| F02M 26/41 | (2016.01) |

(52) U.S. Cl.
CPC ............ *F02M 26/32* (2016.02); *F02M 26/28* (2016.02); *F02M 26/33* (2016.02); *F02M 26/41* (2016.02); *Y02T 10/121* (2013.01); *Y02T 10/16* (2013.01)

(58) Field of Classification Search
CPC ........ F02M 26/22; F02M 26/23; F02M 26/28; F02M 26/29; F02M 26/30; F02M 26/32; F02M 26/33; F02M 26/41
USPC .............. 123/41.02, 568.12, 568.17, 568.18
See application file for complete search history.

(56) References Cited

U.S. PATENT DOCUMENTS

| | | | |
|---|---|---|---|
| 6,612,293 B2* | 9/2003 | Schweinzer | ........ F28D 15/0275 123/568.12 |
| 6,792,898 B2* | 9/2004 | Banzhaf | ................ B60H 1/025 123/41.1 |

(Continued)

FOREIGN PATENT DOCUMENTS

| | | |
|---|---|---|
| JP | 2000-249003 A | 9/2000 |
| JP | 2001-193576 A | 7/2001 |

(Continued)

*Primary Examiner* — Hai Huynh
(74) *Attorney, Agent, or Firm* — McDermott Will & Emery LLP

(57) ABSTRACT

An integrated exhaust gas recirculation (EGR) cooler includes a cooling core allowing an exhaust manifold and an intake manifold to be in communication with each other and an integrated housing having the cooling core inserted thereinto. The integrated housing is provided with a first exhaust port exhausting a coolant introduced thereinto only when a thermo-sensitive device mounted in the integrated housing is operated and a second exhaust port always exhausting the coolant introduced thereinto. An amount of the coolant introduced into an EGR cooler is maximized. Therefore, cooling efficiency may be maximized, and a size of the cooling core may be decreased.

9 Claims, 17 Drawing Sheets

(56) References Cited

U.S. PATENT DOCUMENTS

| | | | | |
|---|---|---|---|---|
| 7,131,263 | B1* | 11/2006 | Styles | F02M 26/35 |
| | | | | 123/568.12 |
| 7,464,700 | B2* | 12/2008 | Kolb | F28D 1/0435 |
| | | | | 123/563 |
| 8,375,926 | B2* | 2/2013 | Sheidler | F02B 29/0418 |
| | | | | 123/542 |
| 8,429,895 | B2* | 4/2013 | Kawazu | F01N 3/0205 |
| | | | | 60/278 |
| 8,794,299 | B2 | 8/2014 | Barfknecht et al. | |
| 8,869,757 | B2* | 10/2014 | Kim | F01P 7/165 |
| | | | | 123/41.12 |
| 9,435,248 | B2* | 9/2016 | Park | F01P 3/02 |
| 9,470,138 | B2* | 10/2016 | Miyagawa | F01P 7/16 |
| 9,470,187 | B2* | 10/2016 | Gliwa | F02M 26/28 |
| 2006/0130818 | A1* | 6/2006 | Igami | F28D 1/047 |
| | | | | 123/568.12 |
| 2008/0047685 | A1 | 2/2008 | Kim | |
| 2008/0314569 | A1 | 12/2008 | Yamazaki et al. | |
| 2011/0308778 | A1* | 12/2011 | Tsuda | F02M 26/32 |
| | | | | 165/157 |
| 2016/0010533 | A1* | 1/2016 | Matsumoto | F01P 3/02 |
| | | | | 123/41.08 |
| 2016/0084143 | A1* | 3/2016 | Lee | F01P 7/165 |
| | | | | 123/41.08 |
| 2016/0123218 | A1* | 5/2016 | Lee | F01P 7/165 |
| | | | | 123/41.08 |
| 2016/0138531 | A1* | 5/2016 | Lee | F02M 26/29 |
| | | | | 123/568.12 |

FOREIGN PATENT DOCUMENTS

| | | |
|---|---|---|
| JP | 2004-257322 A | 9/2004 |
| JP | 2009-002239 A | 1/2009 |
| JP | 2009-036077 A | 2/2009 |
| JP | 2010-203631 A | 9/2010 |
| JP | 2011-241789 A | 12/2011 |
| KR | 10-0823654 B1 | 4/2008 |
| KR | 10-2012-0002739 A | 1/2012 |
| KR | 10-2013-0040326 A | 4/2013 |
| KR | 10-1298382 B1 | 8/2013 |

* cited by examiner

INTEGRATED EXHAUST GAS RECIRCULATION COOLER

CROSS-REFERENCE TO RELATED APPLICATION

This application is based on and claims the benefit of priority to Korean Patent Application No. 10-2015-0019505, filed on Feb. 9, 2015 in the Korean Intellectual Property Office, the disclosure of which is incorporated herein in its entirety by reference.

TECHNICAL FIELD

The present disclosure relates to an integrated exhaust gas recirculation (EGR) cooler, and more particularly, to an integrated EGR cooler capable of distributing a coolant exhausted from an engine to a heater or a radiator.

BACKGROUND

An exhaust gas recirculation (EGR) cooler according to the related art includes an EGR cooler cooling EGR gas, an EGR valve adjusting recirculation timing and an amount of the EGR gas, an EGR pipe connecting an intake manifold or an exhaust manifold and the EGR valve to each other, a cooling hose moving the coolant to the EGR cooler, and the like.

A coolant circulation circuit in the EGR cooler system according to the related art will be described below with reference to FIGS. 1 and 2. The coolant circulation circuit for cooling exhaust gas introduced into an EGR cooler 3 generally includes a water temperature controller (WTC) 2 into which a coolant exhausted from an engine 1 is introduced, the EGR cooler 3 and a heater 4 to which the coolant exhausted from the engine 1 is distributed through the WTC 2, and a water pump 5 receiving the coolant transferred from the EGR cooler 3 and the heater 4 and again introducing the coolant into the engine 1.

As illustrated in FIG. 2, the EGR cooler 3 according to the related art includes an inlet tank 7 positioned at a front end of the EGR cooler 3 and having exhaust gas introduced thereinto and distributed to a cooling core 8, the cooling core 8 configured of a plurality of linear tubes and having the introduced exhaust gas contacting an inner side thereof and a coolant contacting an outer side thereof to generate heat exchange, a body 9 having a structure in which it encloses the plurality of linear tubes configuring the cooling core 8 and inducing a flow of the coolant at an outer side of the plurality of linear tubes, a nipple 10 introducing the coolant from the outside into the body 9 or exhausting the coolant from the body 9 to the outside, and an outlet tank 11 exhausting the exhaust gas cooled through the cooling core 9 to the outside.

However, the EGR cooler according to the related art has a limitation in cooling efficiency since a flow rate of coolant supplied to the EGR cooler is equal to or smaller than a flow rate of coolant supplied to the heater.

In addition, the EGR cooler and the water temperature controller according to the related art should be repeatedly provided with the same components such as the nipples, the outlet tanks, and the like, in order to introduce and exhaust the coolant.

In addition, the EGR cooler according to the related art has been required to secure a space in which associated components are to be separately mounted. Therefore, the EGR cooler according to the related art had a difficulty in a layout design.

RELATED ART DOCUMENT

Patent Document (Patent Document 1) Korea Patent Laid-Open Publication No. 10-2012-0002739 (Published on Jan. 9, 2012)

SUMMARY

The present disclosure has been made to solve the above-mentioned problems occurring in the prior art while advantages achieved by the prior art are maintained intact.

An aspect of the present disclosure provides an integrated exhaust gas recirculation (EGR) cooler with which a water temperature controller (WTC) is integrated.

According to an exemplary embodiment of the present disclosure, an EGR cooler system includes: a cooling core allowing an exhaust manifold and an intake manifold to be in communication with each other and an integrated housing having the cooling core inserted thereinto. The integrated housing is provided with a first exhaust port exhausting a coolant introduced into the integrated housing only when a thermo-sensitive device mounted in the integrated housing is operated and a second exhaust port always exhausting the coolant introduced into the integrated housing.

The first exhaust port may be connected to a radiator to form a first distribution line, and the second exhaust port may be connected to a heater to form a second distribution line.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Exemplary embodiments of the present disclosure will be described in detail with reference to the accompanying drawings.

Figure 1:
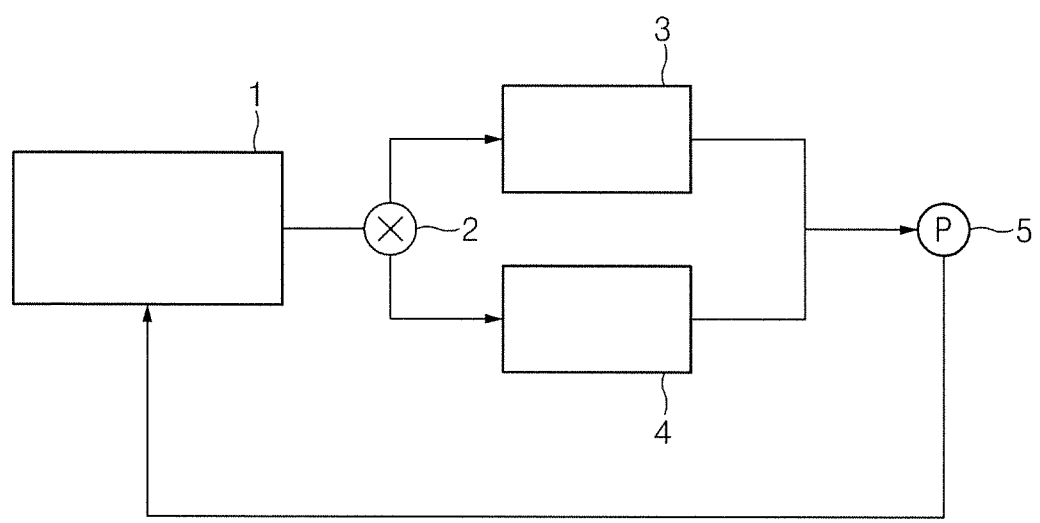
FIG. 1 is a block diagram illustrating a flow of a coolant applied to an exhaust gas recirculation (EGR) cooler according to the related art.
Figure 2:
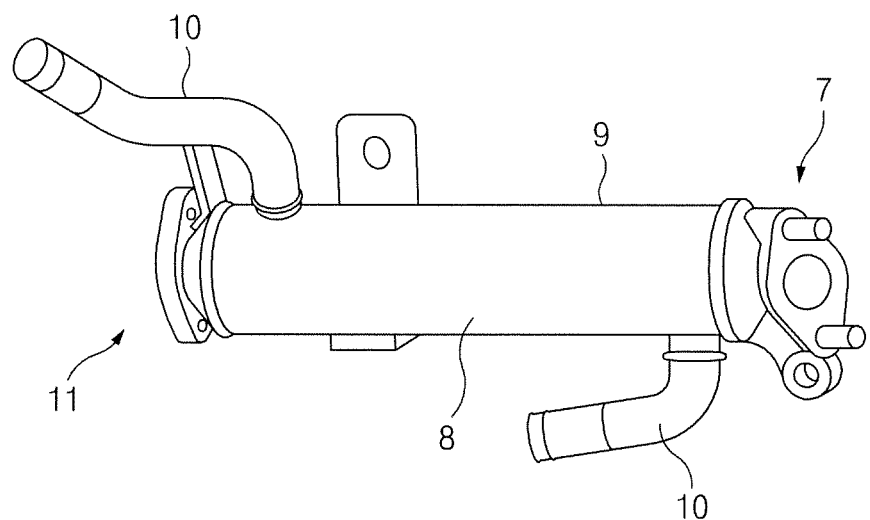
FIG. 2 is a schematic view of the EGR cooler according to the related art.
Figure 3:
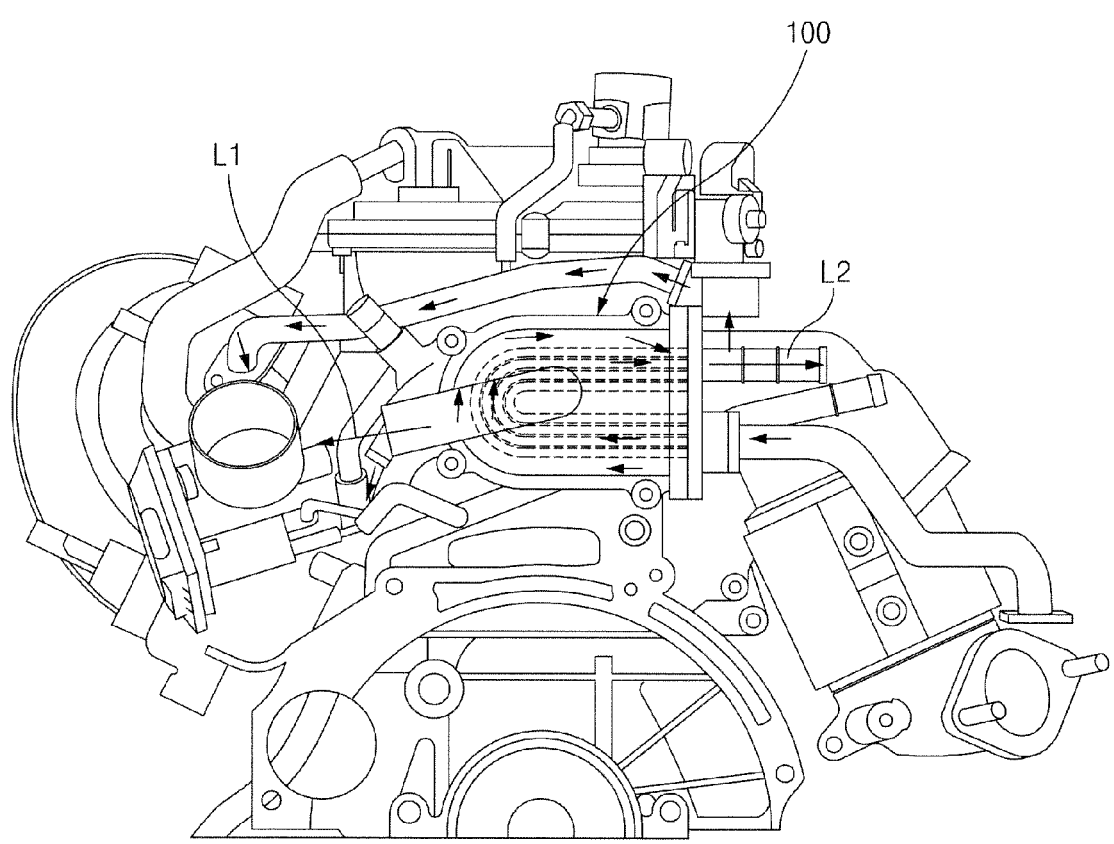
FIG. 3 is a view illustrating an example in which an integrated EGR cooler according to an exemplary embodiment of the present disclosure is mounted.
Figure 4:
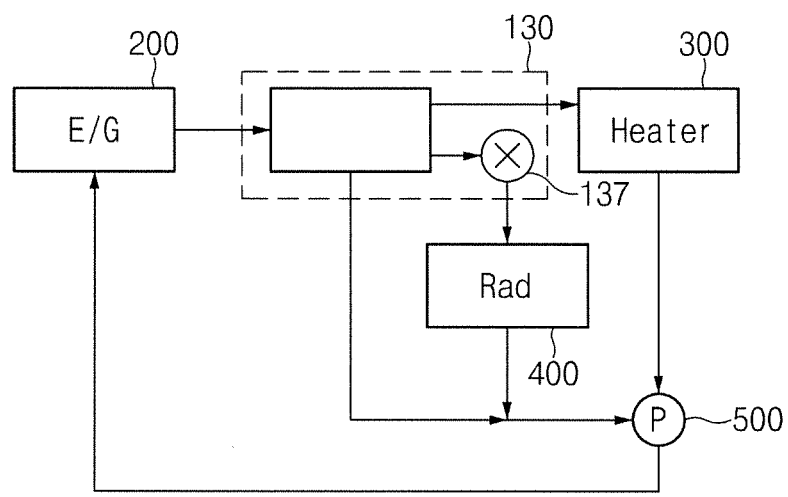
FIG. 4 is a block diagram illustrating a flow of a coolant of the integrated EGR cooler of FIG. 3.
Figure 5:
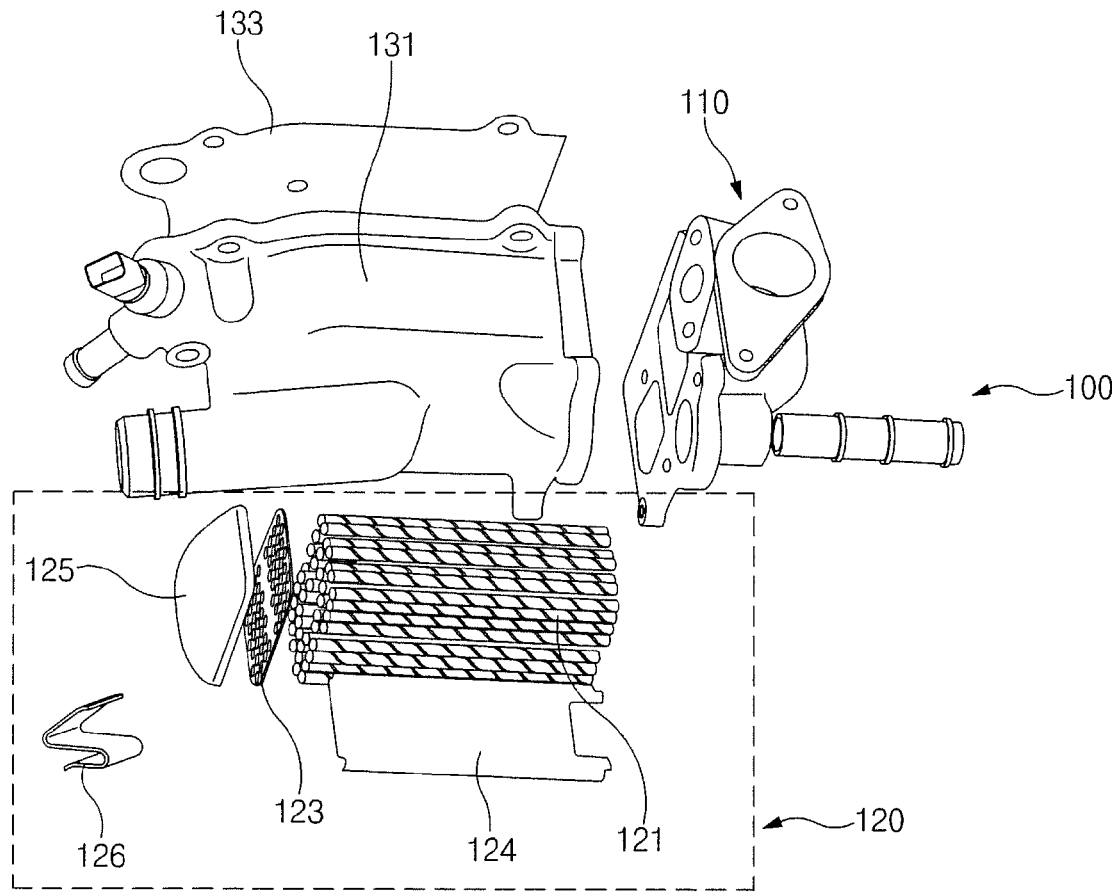
FIG. 5 is an exploded perspective view of the integrated EGR cooler of FIG. 3.
Figure 6:
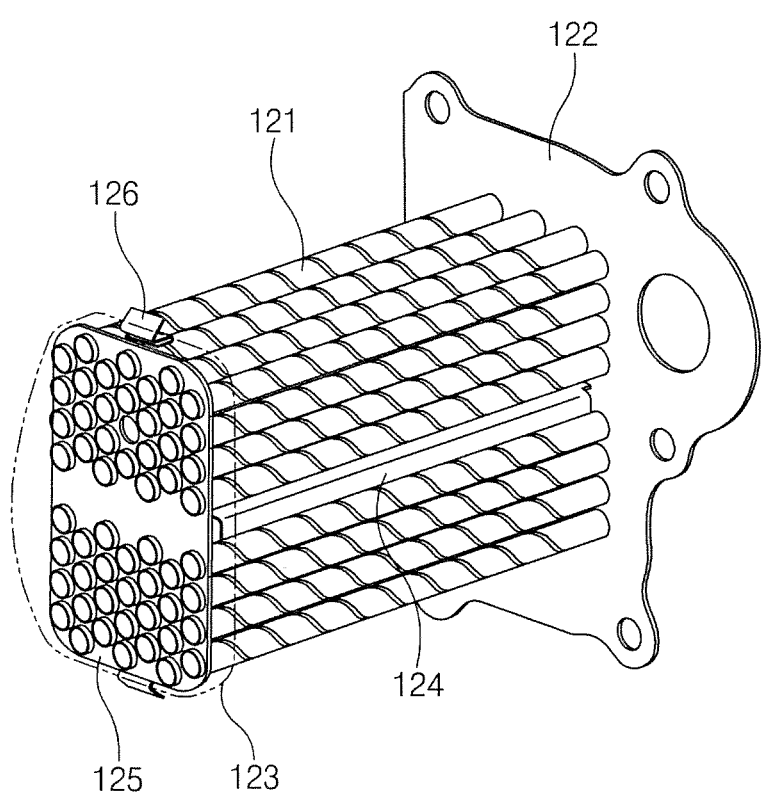
FIG. 6 is a perspective view of a cooling core mounted in the integrated EGR cooler of FIG. 3.
Figure 7:
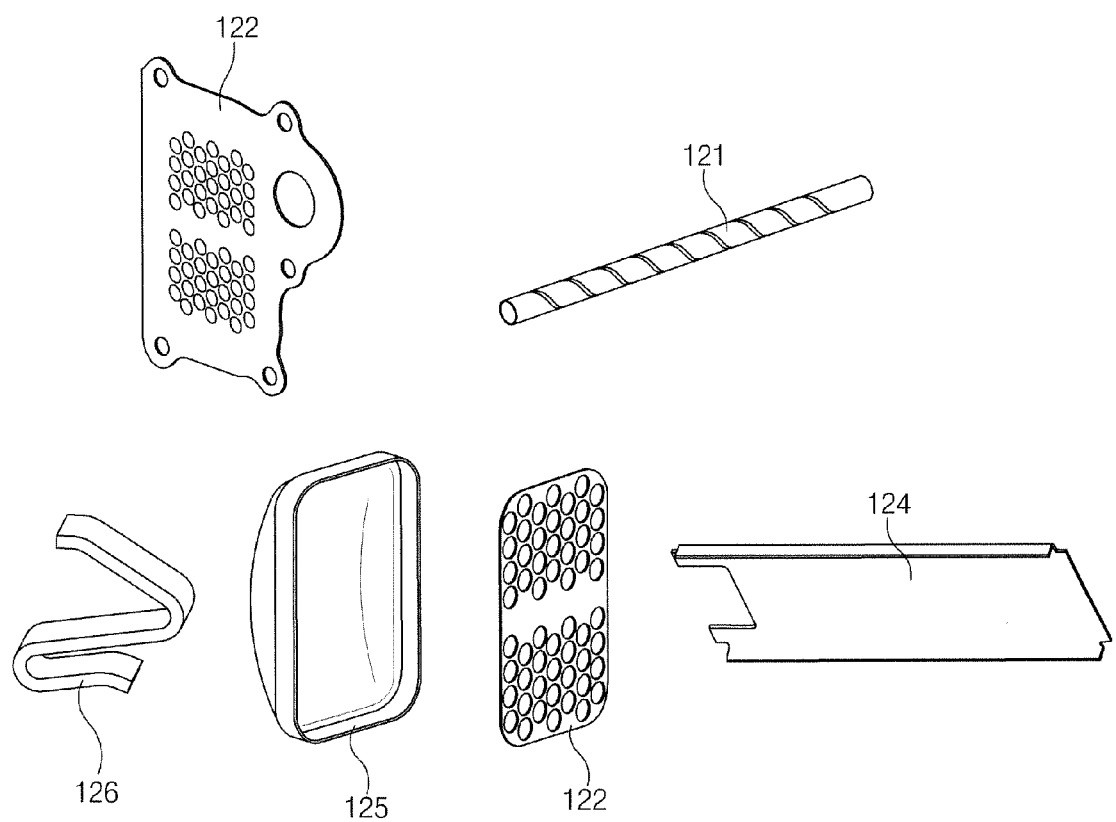
FIG. 7 is a front view of the cooling core mounted in the integrated EGR cooler of FIG. 3.
Figure 8:
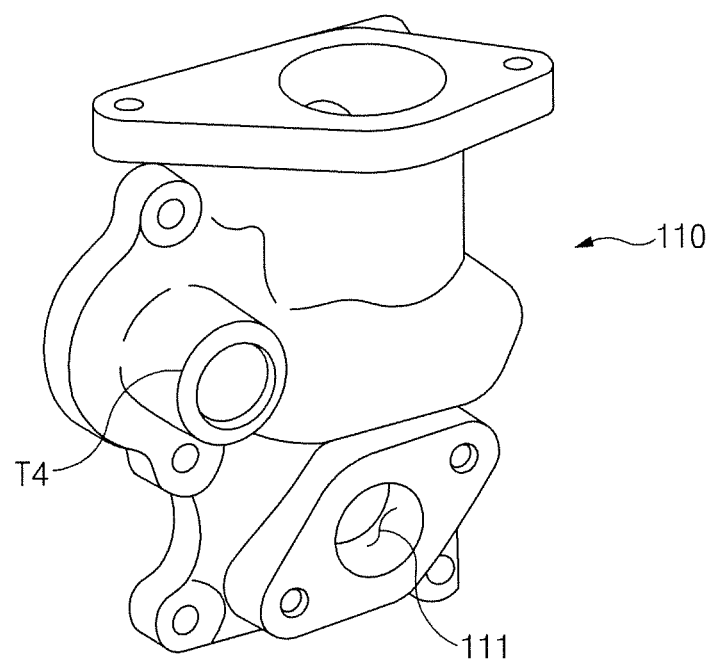
FIG. 8 is a perspective view of an EGR valve housing mounted in the integrated EGR cooler of FIG. 3.
Figure 9:
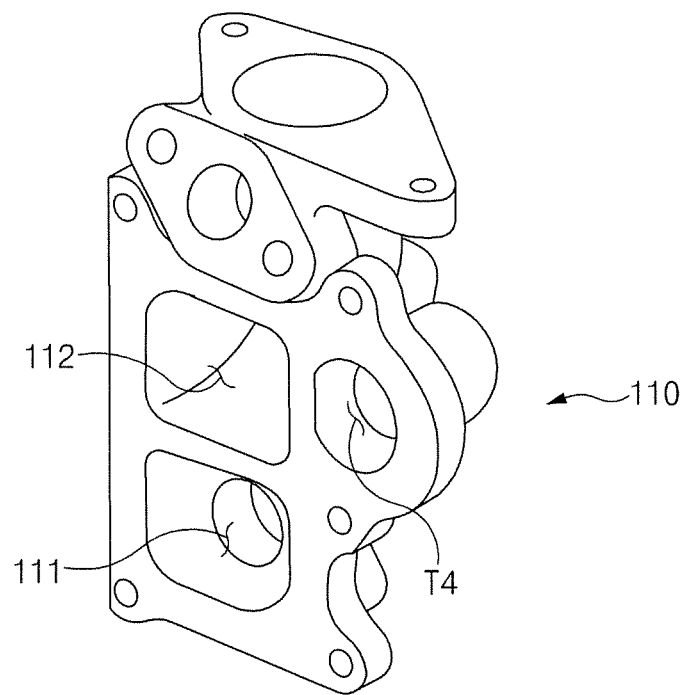
FIG. 9 is another perspective view of the EGR valve housing mounted in the integrated EGR cooler of FIG. 3.
Figure 10:
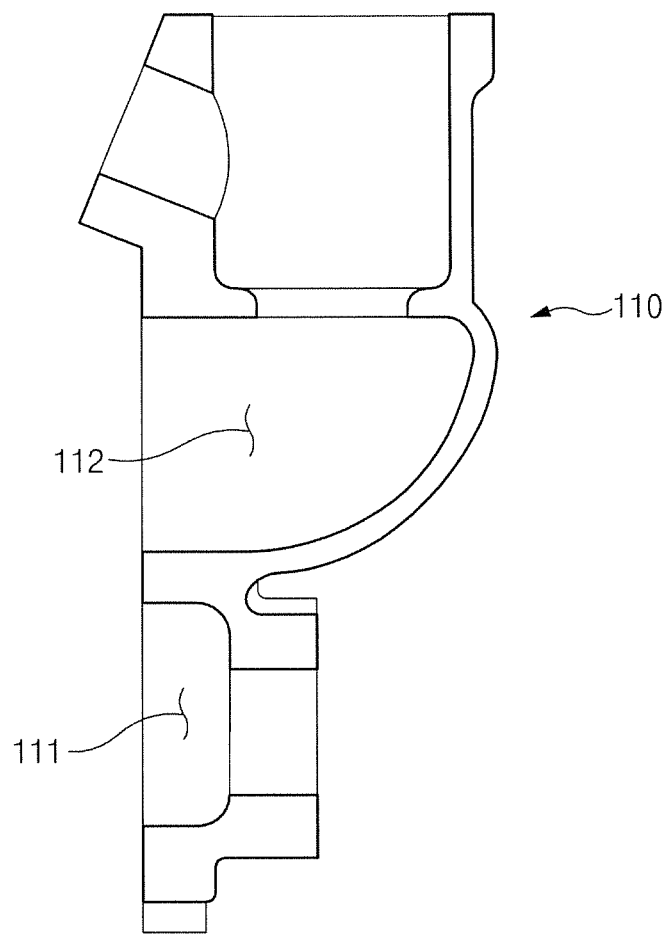
FIG. 10 is a cross-sectional view of main parts of the EGR valve housing mounted in the integrated EGR cooler of FIG. 3.
Figure 11:
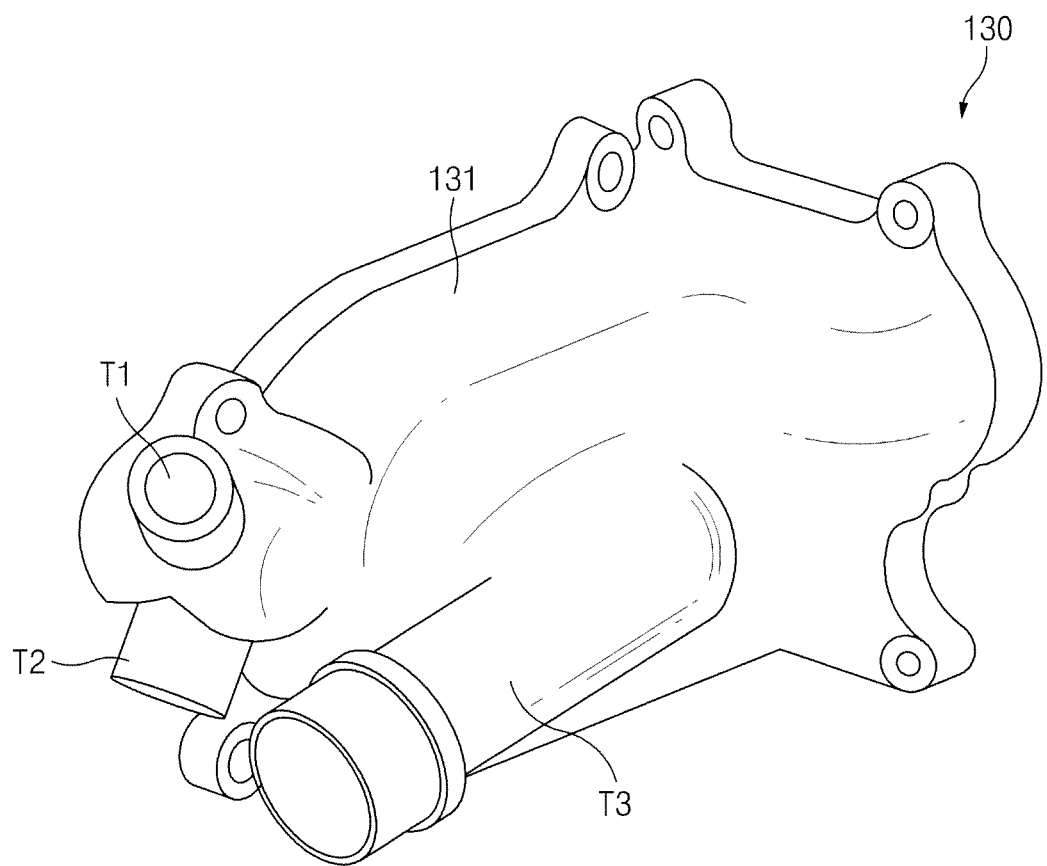
FIG. 11 is a perspective view of an integrated housing mounted in the integrated EGR cooler of FIG. 3.
Figure 12:
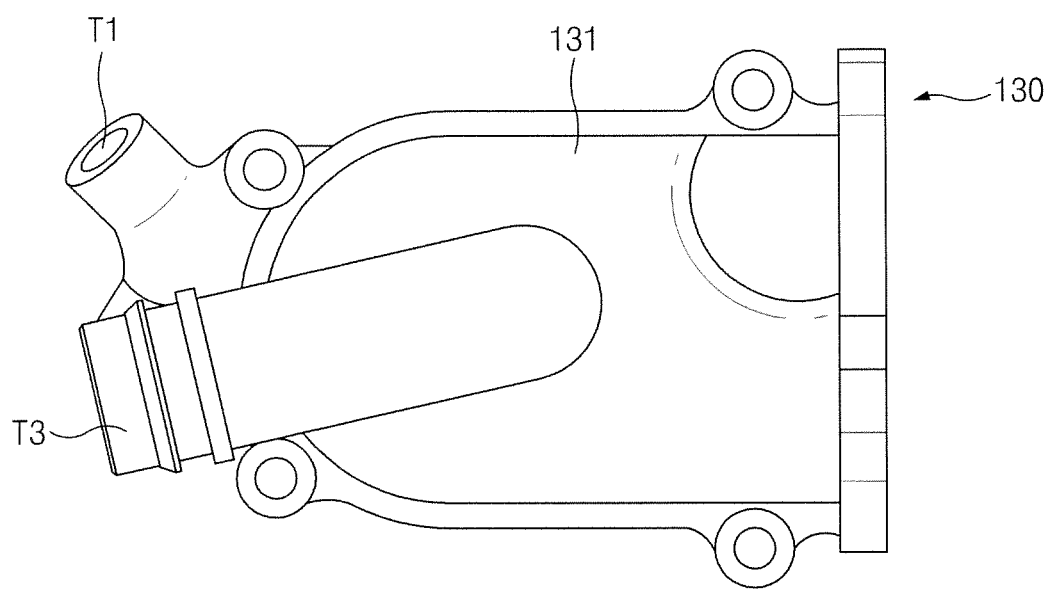
FIG. 12 is a front view of the integrated housing mounted in the integrated EGR cooler of FIG. 3.
Figure 13:
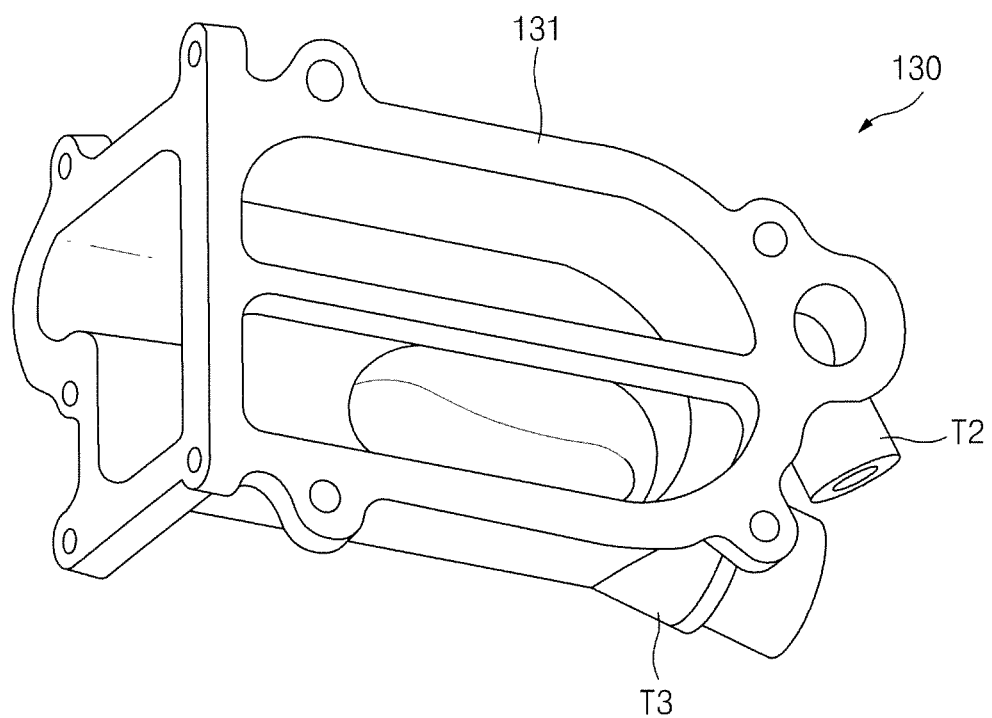
FIG. 13 is another perspective view of the integrated housing mounted in the integrated EGR cooler of FIG. 3.
Figure 14:
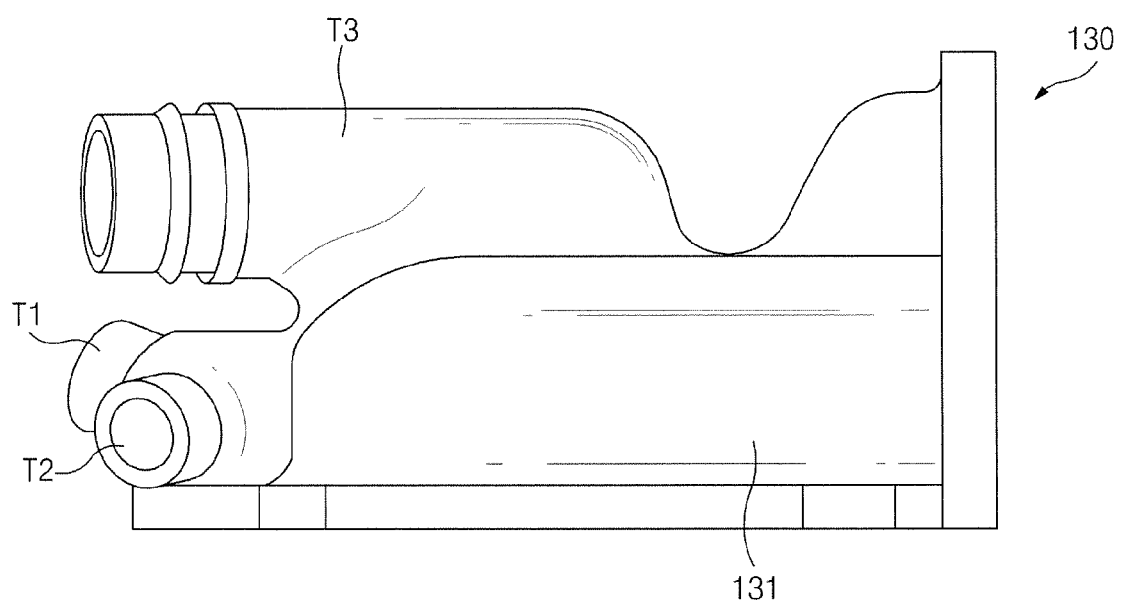
FIG. 14 is a bottom view of the integrated housing mounted in the integrated EGR cooler of FIG. 3.
Figure 15:
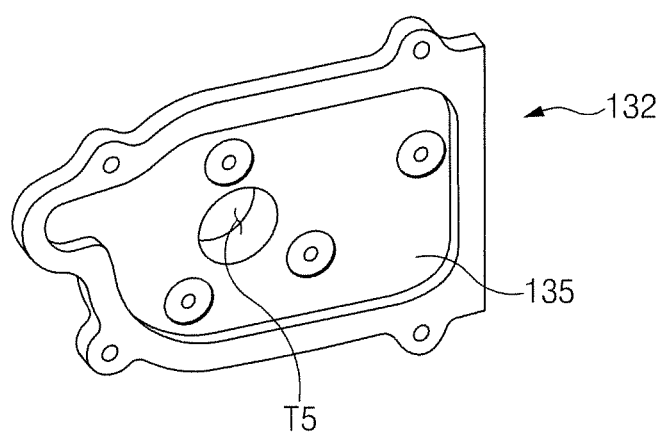
FIG. 15 is a perspective view of an adapter mounted in the integrated EGR cooler of FIG. 3.
Figure 16:
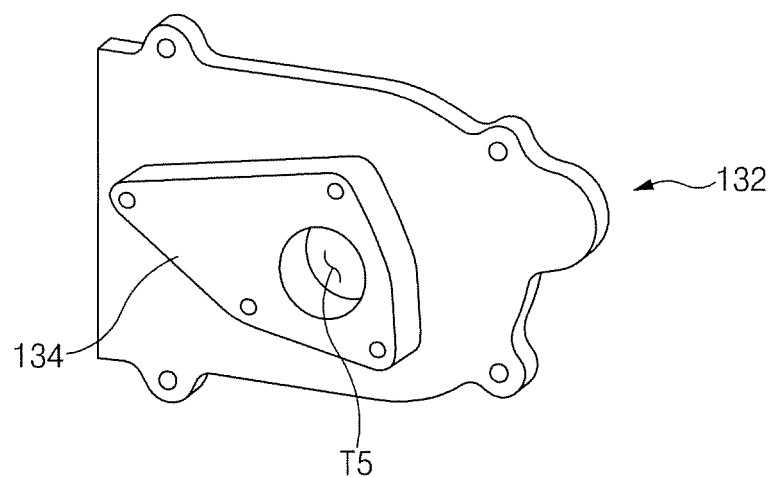
FIG. 16 is another perspective view of the adapter mounted in the integrated EGR cooler of FIG. 3.
Figure 17:
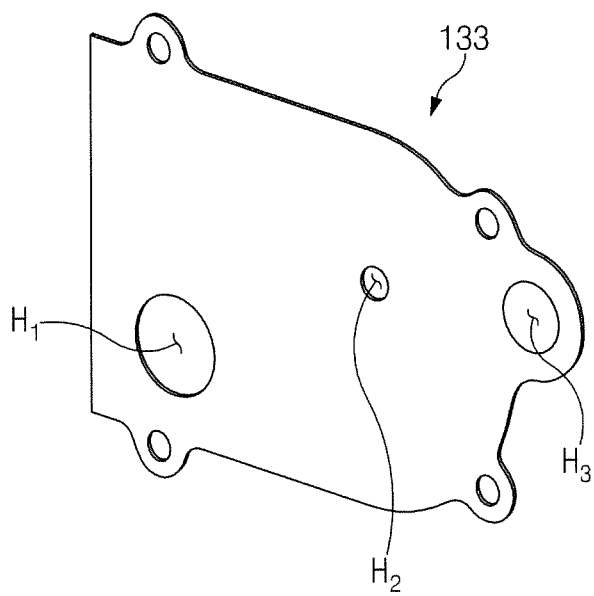
FIG. 17 is a perspective view of a gasket mounted in the integrated EGR cooler of FIG. 3.

As illustrated in FIGS. 3 to 17, an integrated exhaust gas recirculation (EGR) cooler according to an exemplary embodiment of the present disclosure is characterized in that a thermostat T.S. (not shown) is mounted as a thermo-sensitive device in an EGR cooler 100, a first distribution line L1 exhausting a coolant introduced into the EGR cooler 100 only when the thermostat T.S. is operated is formed, and a second distribution line L2 always exhausting the coolant introduced into the EGR cooler 100 is formed.

The EGR cooler 100 includes an EGR valve housing 110 in which a first chamber ill connected to an exhaust manifold and a second chamber 112 connected to an intake manifold are formed, a cooling core 120 mounted on the EGR valve housing 110 so as to allow the first and second chambers 111 and 112 to be in communication with each other, and an integrated housing 130 mounted on the EGR valve housing 110 so that the cooling core 120 is inserted thereinto. The EGR valve housing 110 includes an EGR valve 113 connected to the second chamber 112.

The cooling core 120 is manufactured by welding a first plate 122 and a second plate 123, respectively, to both ends of linear tubes 121 having a spiral or dimple-shaped surface bend.

The cooling core 120 includes a plurality of linear tubes 121, the first plate 122 having the linear tubes 121 fixed thereto in a state in which the linear tubes 121 penetrate therethrough and surface-contacting the EGR valve housing 110, the second plate 123 having the linear tubes 121 fixed thereto in a state in which the linear tubes 121 penetrate therethrough and facing the first plate 122, a separator 124 extended from the center of the first plate 122 to the center of the second plate 123 so that the plurality of linear tubes 121 are separated into upper linear tubes and lower linear tubes, and a tank 125 fixed to the second plate 123 and allowing the upper linear tubes and the lower linear tubes to be in communication with each other.

Since the linear tubes 121 are fixed to the first plate 122 in a cantilever structure, in the case in which excessive stress is generated in connection parts between the linear tubes 121 and the tank 125 due to vibrations of the linear tubes 121, there is a risk that the connection parts between the linear tubes 121 and the tank 125 will be damaged. Therefore, it is preferable that a plurality of clips 126 manufactured so as to have elasticity by bending a plate are mounted at the connection parts between the linear tubes 121 and the tank 125 to absorb the vibrations.

The integrated housing 130 includes a body 131 forming an appearance of the integrated housing 130 and having one surface in a length direction and one surface in a width direction that are opened, an adapter 132 mounted on the opened one surface of the body 131 in the length direction and provided with a coolant introduction port T5 into which the coolant is introduced from an engine 200, and a gasket 133 interposed between the body 131 and the adapter 132.

The adapter 132 and the gasket 133 receive the coolant supplied from the rear of a cylinder head and separate a flow of the coolant supplied from the engine 200 into the cooling core 120 or the thermostat T.S. The adapter 132 has a cylinder head mounting part 134 formed on one surface thereof in order to mount the adapter 132 on the engine 200 and has an integrated housing mounting part 135 formed on the other surface thereof in order to fix the integrated housing 130.

The gasket 133 includes a main path $H_1$ formed therein in order to induce the coolant into the body 131, an auxiliary path $H_2$ formed at one side of the main path $H_1$ so that the coolant may be uniformly induced toward the cooling core 120 provided in the body 131, and a bypass path $H_3$ formed therein in order to induce the coolant to the thermostat T.S. mounted in the body 131.

The body 131 includes a mounting port T1 formed in the body 131 so that the thermostat T.S. is mounted and being in communication with the bypass path $H_3$, a bypass port T2 formed at one side of the mounting port T1 in order to circulate the coolant introduced into the mounting port T1 to a water pump 500, and a first exhaust port T3 formed on a surface that is symmetrical to the adaptor 132 so as to exhaust the coolant from the body 131. In the exemplary embodiment of the present disclosure, the first exhaust port T3 is connected to a radiator 400.

The EGR valve housing 110 includes a second exhaust port T4 formed therein in order to exhaust the coolant flowing to the EGR valve housing 110 through the opened one surface of the body 131 in the width direction to the outside of the body 131. In the exemplary embodiment of the present disclosure, the second exhaust port T4 is connected to a heater 300. The heater 300 generates heat exchange between the coolant and introduced external air. A temperature of the coolant is lowered through the heater 300, and a temperature of the introduced external air is raised through the heater 300. The external air may be exhausted to the outside, and is introduced into a chamber, if necessary, to thereby be used for vehicle heating. In the EGR cooler 100 according to the exemplary embodiment of the present disclosure configured as described above, exhaust gas is introduced from the exhaust manifold into the EGR valve housing 110 and into the cooling core 120. Here, a temperature of the exhaust gas introduced into the cooling core 120 is lowered by the coolant introduced into the EGR valve housing 110. As soon as the EGR valve 113 is opened, the exhaust gas introduced into the cooling core 120 is re-circulated to the intake manifold.

Here, a flow of the coolant introduced into the integrated housing 130 is as follows. The coolant is exhausted from the engine 200, more accurately, the cylinder head. The M coolant exhausted from the engine 200 is introduced between the adapter 132 and the gasket 133 through the coolant introduction port T5 formed in the adapter 132. Then, the coolant is introduced into the body 131 through the main path $H_1$ and the auxiliary path $H_2$ formed in the gasket 133. The coolant introduced into the body 131 absorbs a temperature of the exhaust gas present in the cooling core 120 through conduction and radiation.

Meanwhile, the coolant exhausted to the engine 200 through the bypass path $H_3$ formed in the gasket 133 is introduced into the mounting port T1 on which the thermostat T.S. is mounted. The coolant introduced into the mounting port T1 flows to the water pump 500 through the bypass port T2. The thermostat T.S. is made of a bimetal and is operated to open the first exhaust port T3 when a temperature thereof is a specific temperature or higher.

The coolant introduced into the body 131 is continuously introduced into the heater 300 through the second exhaust port T4 formed in the EGR valve housing 110. The coolant introduced into the heater 300 flows to the water pump 500, and is ultimately re-introduced into a water jacket formed in the engine 200.

In addition, when a temperature of the coolant exhausted from the engine 200 is a specific temperature or higher, a control valve 137 connected to the thermostat T.S. is operated to open the first exhaust port T3, and the coolant introduced into the body 131 is introduced into the radiator 400 through the first exhaust port T3 to discharge heat to the outside. Then, the coolant flows from the radiator 400 to the water pump 500, and is ultimately re-introduced into the water jacket formed in the engine 200.

As described above, with the integrated EGR cooler according to the exemplary embodiment of the present disclosure, the WTC and the EGR cooler are integrated with each other, such that the coolant exhausted from the engine is first introduced into the EGR cooler, thereby making it possible to maximize an amount of the coolant introduced into the EGR cooler. Therefore, cooling efficiency may be maximized, and a size of the cooling core may be decreased.

In addition, the number of components for introducing and exhausting the coolant is minimized, and a layout design of an engine room becomes easy.

Further, a size of the EGR cooler is decreased and the number of components in the EGR cooler is decreased, such that a total weight of a vehicle is decreased, thereby making it possible to improve fuel efficiency.

Hereinabove, although the present disclosure has been described with reference to exemplary embodiments and the accompanying drawings, the present disclosure is not limited thereto, but may be variously modified and altered by those M skilled in the art to which the present disclosure pertains without departing from the spirit and scope of the present disclosure claimed in the following claims.

What is claimed is:

1. An integrated exhaust gas recirculation (EGR) cooler comprising:
a cooling core having exhaust gas flowing therein; and
an integrated housing accommodating the cooling core therein and having a coolant flowing therein,
wherein the integrated housing includes:
a coolant introduction port having the coolant introduced from an engine thereinto;
a first exhaust port exhausting the coolant to a radiator;
a second exhaust port exhausting the coolant to a heater;
a control valve controlling a flow of the coolant through the first exhaust port,
an EGR valve housing having a first chamber connected to an exhaust manifold and a second chamber connected to an intake manifold; and
an EGR cooler housing mounted on the EGR valve housing so that the cooling core is inserted thereinto,
the first and second chambers being in communication with each other through the cooling core.

2. The integrated EGR cooler according to claim 1, wherein the EGR valve housing includes an EGR valve connected to the second chamber.

3. The integrated EGR cooler according to claim 1, wherein the EGR cooler housing includes:
a body forming an appearance of the EGR cooler housing and having one surface in a length direction and one surface in a width direction that are opened;
an adapter mounted on the opened one surface of the body in the length direction and provided with the coolant introduction port; and
a gasket interposed between the body and the adapter.

4. The integrated EGR cooler according to claim 3, wherein the gasket includes:
a main path introducing the coolant into the body of the EGR cooler housing;
an auxiliary path formed at one side of the main path so that the coolant is uniformly induced toward the cooling core provided in the body; and
a bypass path introducing the coolant to a thermo-sensitive device mounted in the body of the EGR cooler housing.

5. The integrated EGR cooler according to claim 4, wherein the body of the EGR cooler housing includes:
a mounting port to which the thermo-sensitive device connected to the control valve is mounted, and being in communication with the bypass path; and
a bypass port formed at one side of the mounting port in order to circulate the coolant introduced into the mounting port to a water pump, and
the first exhaust port is formed on a surface that is symmetrical to the adaptor.

6. The integrated EGR cooler according to claim 3, wherein the second exhaust port is formed in the EGR valve housing.

7. The integrated EGR cooler according to claim 6, wherein the EGR valve housing is attached to the body so as to be directed toward the opened one surface of the body in the width direction.

8. The integrated EGR cooler according to claim 1, wherein the cooling core includes:
a plurality of linear tubes having bents formed thereon so that surface areas thereof are increased;
a first plate having the linear tubes fixed thereto in a state in which first ends of the linear tubes penetrate therethrough and surface-contacting the EGR valve housing;
a second plate having the linear tubes fixed thereto in a state in which second sends of the linear tubes opposite to the first ends penetrate therethrough and facing the first plate;
a separator extended between centers of the first and second plates and separating the plurality of linear tubes into upper linear tubes and lower linear tubes; and
a tank fixed to the second plate and allowing the upper linear tubes and the lower linear tubes to be in communication with each other.

9. The integrated EGR cooler according to claim 8, wherein the first exhaust port is connected to the radiator to form a first distribution line, and
the second exhaust port is connected to the heater to form a second distribution line.

* * * * *